(12) United States Patent
Hashimoto et al.

(10) Patent No.: US 9,190,680 B2
(45) Date of Patent: Nov. 17, 2015

(54) FUEL BATTERY

(75) Inventors: Keiji Hashimoto, Kariya (JP); Kousuke Kawajiri, Kariya (JP); Satoshi Futami, Kariya (JP)

(73) Assignees: Toyota Shatai Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 194 days.

(21) Appl. No.: 14/007,952

(22) PCT Filed: Apr. 11, 2012

(86) PCT No.: PCT/JP2012/059873
§ 371 (c)(1),
(2), (4) Date: Sep. 26, 2013

(87) PCT Pub. No.: WO2012/144385
PCT Pub. Date: Oct. 26, 2012

(65) Prior Publication Data
US 2014/0017582 A1 Jan. 16, 2014

(30) Foreign Application Priority Data
Apr. 18, 2011 (JP) ................................. 2011-092229

(51) Int. Cl.
*H01M 8/02* (2006.01)
*H01M 8/04* (2006.01)

(52) U.S. Cl.
CPC ........ *H01M 8/04291* (2013.01); *H01M 8/0247* (2013.01); *H01M 8/0267* (2013.01); *Y02E 60/50* (2013.01)

(58) Field of Classification Search
None
See application file for complete search history.

(56) References Cited

U.S. PATENT DOCUMENTS

2006/0257704 A1* 11/2006 Ogino et al. .................... 429/30
2011/0097638 A1 4/2011 Goto et al.

FOREIGN PATENT DOCUMENTS

| JP | 2003-197222 A | 7/2003 |
| JP | 2003-317734 A | 11/2003 |
| JP | 2006-066257 A | 3/2006 |
| JP | 2007-087768 A | 4/2007 |

(Continued)

OTHER PUBLICATIONS

English translation of International Preliminary Report on Patentability—PCT/JP2012/059873, dated Oct. 22, 2013, 5 pages.

(Continued)

*Primary Examiner* — Patrick Ryan
*Assistant Examiner* — Wyatt McConnell
(74) *Attorney, Agent, or Firm* — Kilpatrick Townsend & Stockton LLP

(57) ABSTRACT

A fuel battery includes an oxidant gas flow passage having a downstream section, in which a gas diffusion porous body is arranged. The fuel battery includes a fuel gas flow passage having a downstream section, in which a gas diffusion porous body is arranged. A cooling medium flow passage is formed between a first separator of each unit cell of the fuel battery and a second separator of a unit cell adjacent to the unit cell. The flowing direction of a cooling medium in the cooling medium flow passage is the same as that of oxidant gas in the oxidant gas flow passage. An upstream section of the cooling medium flow passage is located closer to a surface of a membrane-electrode assembly that faces the oxidant gas flow passage adjacent to the cooling medium flow passage as compared with a downstream section of the cooling medium flow passage.

12 Claims, 10 Drawing Sheets

(56) References Cited

FOREIGN PATENT DOCUMENTS

| JP | 2008-293745 A | 12/2008 |
| JP | 2009-245726 A | 10/2009 |
| JP | 2009-259758 A | 11/2009 |
| JP | 4422505 B2 | 2/2010 |
| WO | WO2010/113252 A1 | 10/2010 |

OTHER PUBLICATIONS

Office Action dated Apr. 3, 2015 corresponding to Chinese Patent Application No. 201280016429.9, dated Apr. 3, 2015.

* cited by examiner

Fig.7(a)
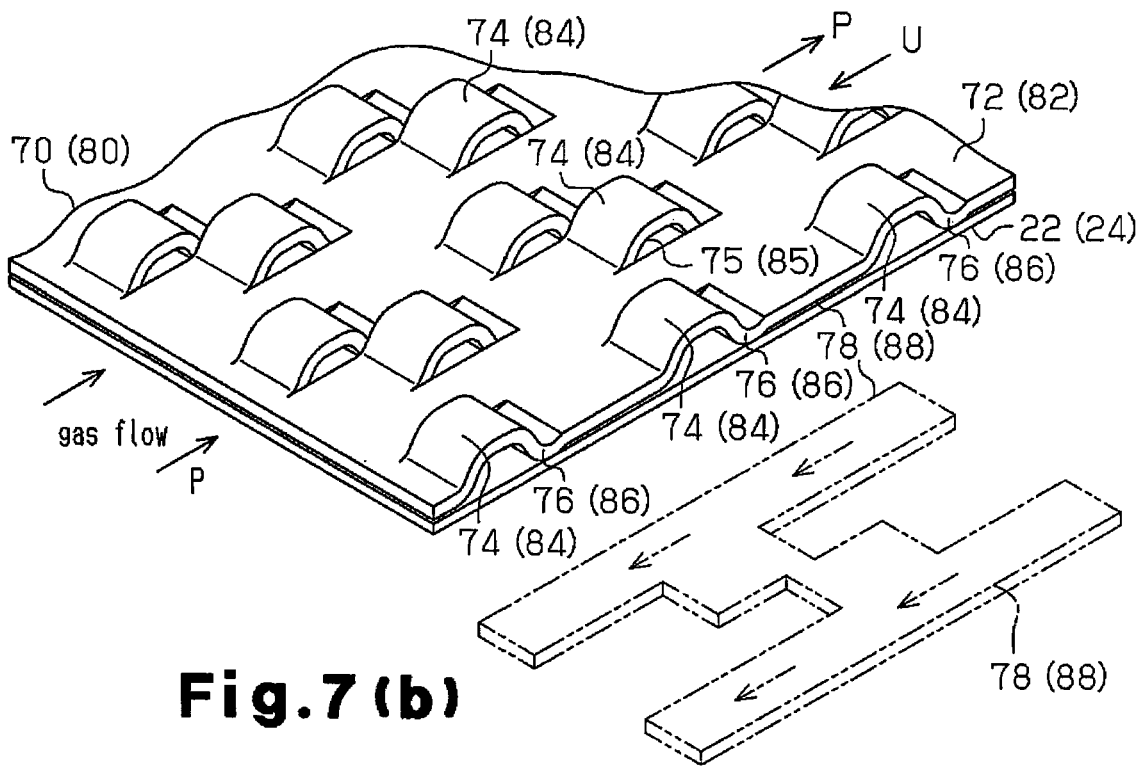
Fig.7(b)
Fig.8
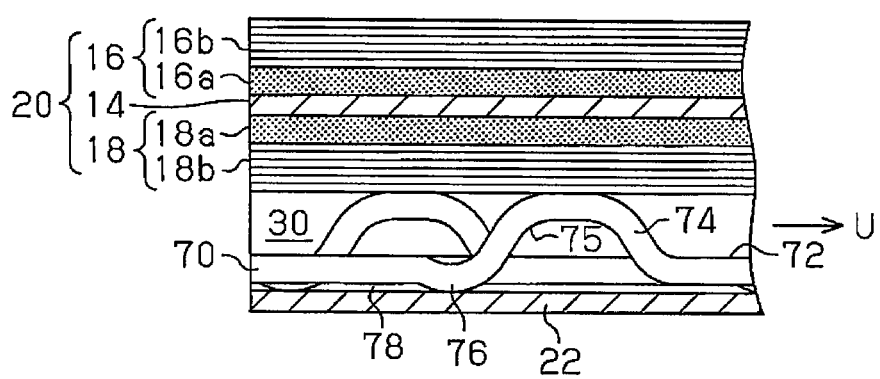

FUEL BATTERY

TECHNICAL FIELD

The present invention relates to a fuel battery.

BACKGROUND ART

In a solid polymer electrolyte fuel battery, membrane-electrode assemblies (MEAs) and separators are alternately arranged. The MEA is composed of an ion-exchange electrolyte membrane, an anode (fuel electrode) arranged on one surface of the electrolyte membrane, and a cathode (oxygen electrode) arranged on the other surface of the electrolyte membrane. The separators form fluid passages for respectively supplying fuel gas (hydrogen) and oxidant gas (oxygen, normally air) to the anode and the cathode. The fuel battery has a stack structure in which unit cells (electric cells) each composed of an MEA and a separator are stacked and integrated. Since the solid polymer electrolyte fuel battery has advantages of easy miniaturization, operation at low temperatures and others, it is attracting attention particularly as a power supply for a moving body such as a vehicle.

Miniaturization and lower cost for fuel batteries of this type have been sought for practical use. In this respect, a cooling system and a humidification system can be simplified if a fuel battery is operable under high temperature and no humidity.

Patent Document 1 discloses a fuel battery operable under high temperature and no humidity which is configured to, when the moisture content is insufficient near the oxidant gas flow passage inlet, which is most likely to become dry, i.e. in the upstream section of the oxidant gas flow passage, increase the moisture content near the inlet of the oxidant gas flow passage by increasing a fuel gas flow rate or decreasing a fuel gas pressure.

Patent Document 2 discloses a fuel battery having a transverse section as shown in FIG. 12. Each unit cell 100 of the fuel battery includes a membrane-electrode assembly (MEA) 108 and a pair of separators 110, 112. The membrane-electrode assembly 108 is so structured that a polymer electrolyte membrane 102 is sandwiched between a cathode (oxygen electrode) 104 and an anode (fuel electrode) 106. The separators 110, 112 of each unit cell 100 are arranged to sandwich the membrane-electrode assembly 108. An oxidant gas flow passage 114 is formed between the separator 110 and the cathode 104. A fuel gas flow passage 116 is formed between the separator 112 and the anode 106. The cathode 104 is formed by laminating a cathode catalyst layer 104a and a gas diffusion layer 104b. The anode 106 is formed by laminating an anode catalyst layer 106a and a gas diffusion layer 106b. Each separator 110, 112 includes a plurality of grooves. The grooves of the separator 110 of each unit cell 100 are located to face the grooves of the separator 112 of a unit cell 110 adjacent to the same unit cell 100, and a cooling medium flow passage 120 is formed by these grooves facing each other. Since the cooling medium flow passages 120 are provided near the membrane-electrode assemblies 108, the fuel battery is efficiently cooled with a low thermal resistance by a cooling medium (e.g. cooling water) flowing in the cooling medium flow passages 120.

Patent Document 3 discloses a fuel battery having a transverse section as shown in FIG. 13. In FIG. 13, components corresponding to those of the fuel battery of FIG. 12 are denoted by the same reference signs as in FIG. 12. In the fuel battery of FIG. 13, gas diffusion porous bodies 130, 140 are respectively provided in a fuel gas flow passage 116 and an oxidant gas flow passage 114 to uniformly diffuse gases in the entireties of the respective fuel gas flow passage 116 and oxidant gas flow passage 114, thereby enhancing the performance of the fuel battery.

Further, in a fuel battery disclosed in Patent Document 4, a water-conducting layer is provided in a gas diffusion porous body to improve the drainability of water produced in the fuel battery.

PRIOR ART DOCUMENTS

Patent Document 1: Japanese Laid-Open Patent Publication No. 2009-259758
Patent Document 2: Japanese Laid-Open Patent Publication No. 2003-197222
Patent Document 3: Japanese Laid-Open Patent Publication No. 2007-87768
Patent Document 4: International Publication No. WO 2010/113252

SUMMARY OF THE INVENTION

Problems that the Invention is to Solve

The fuel batteries disclosed in Patent Documents 1 and 2 have a high cooling property and are thus excellent in high-temperature performance. However, the drainability and gas diffusivity are poor near the outlet of the oxidant gas flow passage, where the moisture content is particularly high, i.e. in the downstream section of the oxidant gas flow passage. Thus, there is a problem of low operational performance in a range where a load of the fuel battery is not very much high, i.e. in an ordinary temperature range where the battery temperature is about 50° C. to about 60° C. In the case of an electric vehicle in which a fuel battery of this type is mounted, the fuel battery generates power in the ordinary temperature range while the vehicle is driving at a cruising speed.

The fuel battery disclosed in Patent Document 3 is excellent in voltage stability, particularly in an ordinary temperature range. However, the cooling performance in a high-temperature environment tends to be insufficient due to a large thermal resistance. Thus, there is a problem that high-temperature performance is not high.

When the oxidant gas flow passage 114 and the fuel gas flow passage 116 are formed by the grooves provided on the entire surfaces of the separators 110, 112 as shown in FIG. 12 or when the gas diffusion porous bodies 130, 140 are arranged to correspond to the entire surfaces of the membrane-electrode assembly 108 as shown in FIG. 13, it is possible to uniformly cool the anode (fuel electrode) and the cathode (oxygen electrode). However, a part of the cathode located near the inlet of the oxidant gas flow passage (upstream section) cannot be actively cooled, wherefore there is a problem of poor high-temperature performance.

Accordingly, it is an objective of the present invention to provide a fuel battery capable of improving high-temperature performance, operational performance under high temperature and no humidity, and power generation performance and to improve voltage stability in an ordinary temperature range by providing good drainability and gas diffusivity particularly in the downstream section of an oxidant gas flow passage, where the moisture content is high.

Means for Solving the Problems

To achieve the foregoing objective and in accordance with a first aspect of the present invention, a fuel battery is provided that includes a plurality of laminated unit cells. Each unit cell includes a membrane-electrode assembly, in which an electrode is arranged on each of both surfaces of a solid polymer electrolyte membrane, and a first separator and a second separator arranged to sandwich the membrane-electrode assembly therebetween. An oxidant gas flow passage is formed between the first separator and the membrane-electrode assembly of each unit cell. A fuel gas flow passage is formed between the second separator and the membrane-electrode assembly of each unit cell. The flowing direction of oxidant gas in the oxidant gas flow passage of each unit cell is opposite to that of fuel gas in the fuel gas flow passage of the same unit cell. Each oxidant gas flow passage includes an upstream section and a downstream section with respect to the flowing direction of the oxidant gas in the oxidant gas flow passage. The upstream section of the oxidant gas flow passage is formed as a plurality of groove flow passages independent of each other by providing a plurality of first grooves on a surface of the first separator that faces the membrane-electrode assembly of each unit cell. A first gas diffusion porous body is arranged in the downstream section of each oxidant gas flow passage. Each fuel gas flow passage includes an upstream section and a downstream section with respect to the flowing direction of the fuel gas in the fuel gas flow passage. The upstream section of the fuel gas flow passage is formed as a plurality of groove flow passages independent of each other by providing a plurality of second grooves on a surface of the second separator that faces the membrane-electrode assembly of each unit cell. A second gas diffusion porous body is arranged in the downstream section of each fuel gas flow passage. A cooling medium flow passage is formed between the first separator of each unit cell and the second separator of a unit cell adjacent to the same unit cell. The flowing direction of a cooling medium in the cooling medium flow passage between the unit cells adjacent to each other is the same as that of the oxidant gas in the oxidant gas flow passages of these unit cells. Each cooling medium flow passage includes an upstream section and a downstream section with respect to the flowing direction of the cooling medium in the cooling medium flow passage. The upstream section of each cooling medium flow passage is located closer to a surface of the membrane-electrode assembly that faces the oxidant gas flow passage adjacent to the cooling medium flow passage as compared with the downstream section of the same cooling medium flow passage.

In accordance with a second aspect of the present invention, a fuel battery is provided that includes a plurality of laminated unit cells. Each unit cell includes a membrane-electrode assembly, in which an electrode is arranged on each of both surfaces of a solid polymer electrolyte membrane, and a first separator and a second separator arranged to sandwich the membrane-electrode assembly therebetween. An oxidant gas flow passage is formed between the first separator and the membrane-electrode assembly of each unit cell. A fuel gas flow passage is formed between the second separator and the membrane-electrode assembly of each unit cell. The flowing direction of oxidant gas in the oxidant gas flow passage of each unit cell is opposite to that of fuel gas in the fuel gas flow passage of the same unit cell. Each oxidant gas flow passage includes an upstream section and a downstream section with respect to the flowing direction of the oxidant gas in the oxidant gas flow passage. The upstream section of the oxidant gas flow passage is formed as a plurality of groove flow passages independent of each other by providing a plurality of first grooves on a surface of the first separator that faces the membrane-electrode assembly of each unit cell. A first gas diffusion porous body is arranged in the downstream section of each oxidant gas flow passage. Each fuel gas flow passage includes an upstream section and a downstream section with respect to the flowing direction of the fuel gas in the fuel gas flow passage. In the upstream section of the fuel gas flow passage, a plurality of second grooves are provided on a surface of the second separator that faces the membrane-electrode assembly of each unit cell. A second gas diffusion porous body is arranged in the downstream section and the upstream section of each fuel gas flow passage. A cooling medium flow passage is formed between the first separator of each unit cell and the second separator of a unit cell adjacent to the same unit cell. The flowing direction of a cooling medium in the cooling medium flow passage between the unit cells adjacent to each other is the same as that of the oxidant gas in the oxidant gas flow passages of these unit cells. Each cooling medium flow passage includes an upstream section and a downstream section with respect to the flowing direction of the cooling medium in the cooling medium flow passage. The upstream section of each cooling medium flow passage is located closer to a surface of the membrane-electrode assembly that faces the oxidant gas flow passage adjacent to the cooling medium flow passage as compared with the downstream section of the same cooling medium flow passage.

In accordance with a third aspect of the present invention, a fuel battery is provided that includes a plurality of laminated unit cells. Each unit cell includes a membrane-electrode assembly, in which an electrode is arranged on each of both surfaces of a solid polymer electrolyte membrane, and a first separator and a second separator arranged to sandwich the membrane-electrode assembly therebetween. An oxidant gas flow passage is formed between the first separator and the membrane-electrode assembly of each unit cell. A fuel gas flow passage is formed between the second separator and the membrane-electrode assembly of each unit cell. The flowing direction of oxidant gas in the oxidant gas flow passage of each unit cell is the same as that of fuel gas in the fuel gas flow passage of the same unit cell. Each oxidant gas flow passage includes an upstream section and a downstream section with respect to the flowing direction of the oxidant gas in the oxidant gas flow passage. The upstream section of the oxidant gas flow passage is formed as a plurality of groove flow passages independent of each other by providing a plurality of first grooves on a surface of the first separator that faces the membrane-electrode assembly of each unit cell. A first gas diffusion porous body is arranged in the downstream section of each oxidant gas flow passage. Each fuel gas flow passage includes an upstream section and a downstream section with respect to the flowing direction of the fuel gas in the fuel gas flow passage. A second gas diffusion porous body is arranged in the downstream section and the upstream section of each fuel gas flow passage. A cooling medium flow passage is formed between the first separator of each unit cell and the second separator of a unit cell adjacent to the same unit cell. The flowing direction of a cooling medium in the cooling medium flow passage between the unit cells adjacent to each other is the same as that of the oxidant gas in the oxidant gas flow passages of these unit cells. Each cooling medium flow passage includes an upstream section and a downstream section with respect to the flowing direction of the cooling medium in the cooling medium flow passage. The upstream section of each cooling medium flow passage is located closer to a surface of the membrane-electrode assembly that faces the oxidant gas flow passage adjacent to the cooling medium flow passage as compared with the same downstream section of the cooling medium flow passage.

In the fuel batteries according to the above first to third aspects, the first separator of each unit cell may be held in contact with the membrane-electrode assembly of the same unit cell at a part corresponding to the upstream section of the cooling medium flow passage.

In the fuel batteries according to the above first to third aspects, a first water flow passage for discharging water in the oxidant gas flow passage from the oxidant gas flow passage may be provided between the first separator and the first gas diffusion porous body of each unit cell. As the oxidant gas flows in the oxidant gas flow passage, the water in the first water flow passage moves within the clearance in the same direction as the flowing direction of the oxidant gas and is discharged from the oxidant gas flow passage.

In the fuel batteries according to the above first to third aspects, a second water flow passage for discharging water in the fuel gas flow passage from the fuel gas flow passage may be provided between the second separator and the second gas diffusion porous body of each unit cell. As the fuel gas flows in the fuel gas flow passage, the water in the second water flow passage moves within the clearance in the same direction as the flowing direction of the fuel gas and is discharged from the fuel gas flow passage.

Effects of the Invention

According to the present invention, high-temperature performance, operational performance under high temperature and no humidity, and power generation performance can be improved and, further, voltage stability in an ordinary temperature range can be improved by providing good drainability and gas diffusivity particularly in the downstream section of an oxidant gas flow passage, where the moisture content is high.

If the first separator of each unit cell is held in contact with the membrane-electrode assembly of the same unit cell at a part corresponding to the upstream section of the cooling medium flow passage, the upstream section of the oxidant gas flow passage can be efficiently cooled by the cooling medium flowing in the cooling medium flow passage, which further improves high-temperature performance, operational performance under high temperature and no humidity, and power generation performance.

If a first water flow passage for discharging water in the oxidant gas flow passage from the oxidant gas flow passage is provided between the first separator and the first gas diffusion porous body of each unit cell, the drainability of the oxidant gas flow passage is improved, with the result that the power generation efficiency of the fuel battery and the voltage stability thereof in an ordinary temperature range are improved.

If a second water flow passage for discharging water in the fuel gas flow passage from the fuel gas flow passage is provided between the second separator and the second gas diffusion porous body of each unit cell, the drainability of the fuel gas flow passage is improved, with the result that the power generation efficiency of the fuel battery is improved.

BRIEF DESCRIPTION OF THE DRAWINGS

FIG. 7(a) is a perspective view showing a part of a gas diffusion porous body of a fuel battery according to a second embodiment of the present invention;

FIG. 7(b) is a view showing a water flow passage provided between the gas diffusion porous body shown in FIG. 7(a) and a separator;

FIG. 8 is a cross-sectional view showing a part of a unit cell of the fuel battery of the second embodiment;

MODES FOR CARRYING OUT THE INVENTION

First Embodiment

Hereinafter, a fuel battery according to a first embodiment of the present invention will be described with reference to FIGS. 1 to 6.

Figure 6:
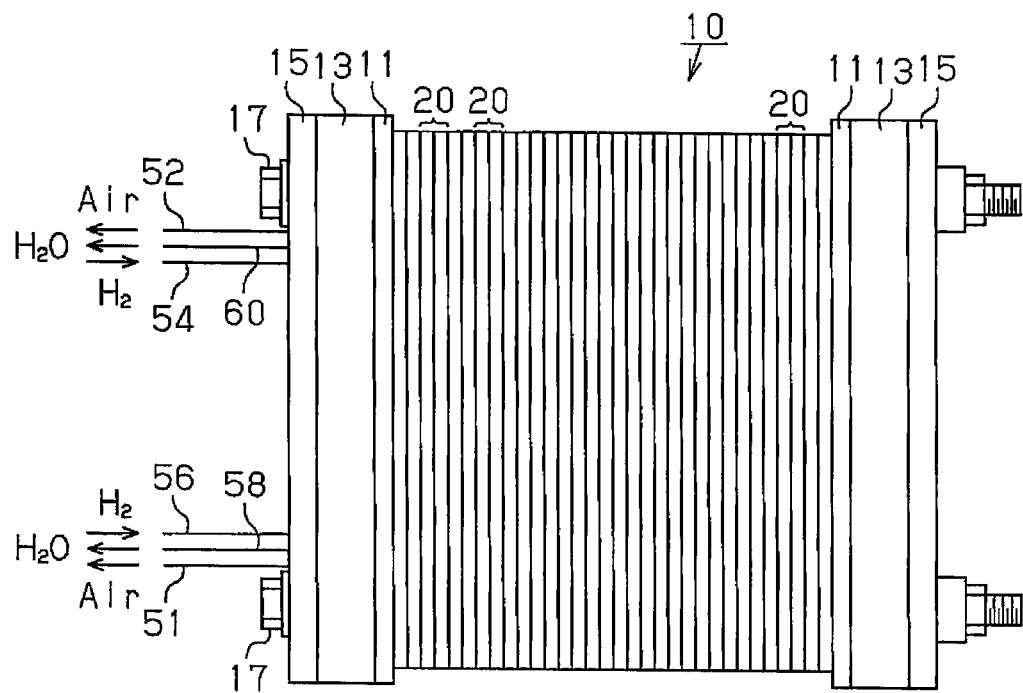
FIG. 6 is an overall schematic view of the fuel battery shown in FIG. 1.

As shown in FIG. 6, a fuel battery 10 has a stack structure in which a multitude of unit cells 12 (see FIG. 2) are stacked together. The stacked unit cells 12 are arranged between a pair of current collecting plates 11. The two current collecting plates 11 are arranged between a pair of insulating plates 13. The two insulating plates 13 are arranged between a pair of end plates 15. The unit cells 12, the current collecting plates 11, and the insulating plates 13 are sandwiched between the two end plates 15 by being fastened by fastening bolts 17.

An oxidant gas piping system, a fuel gas piping system, and a cooling medium piping system are connected to the fuel battery 10. The oxidant gas piping system is for supplying and discharging air (oxygen) as oxidant gas to and from the fuel battery 10 and, as shown in FIG. 6, includes an oxidant gas supply pipe 51 connected to an unillustrated oxidant gas supply port of the fuel battery 10 and an oxidant gas discharge pipe 52 connected to an unillustrated oxidant gas discharge port of the fuel battery 10.

The fuel gas piping system is for supplying and discharging hydrogen as fuel gas to and from the fuel battery 10 and includes a fuel gas supply pipe 54 connected to an unillustrated fuel gas supply port of the fuel battery 10 and a fuel gas discharge pipe 56 connected to an unillustrated fuel gas discharge port of the fuel battery 10.

The cooling medium piping system is for supplying and discharging water as a cooling medium to and from the fuel battery 10 and includes a cooling medium supply pipe 58 connected to an unillustrated cooling medium supply port of the fuel battery 10 and a cooling medium discharge pipe 60 connected to an unillustrated cooling medium discharge port of the fuel battery 10.

(Unit Cell 12)

Figure 2:
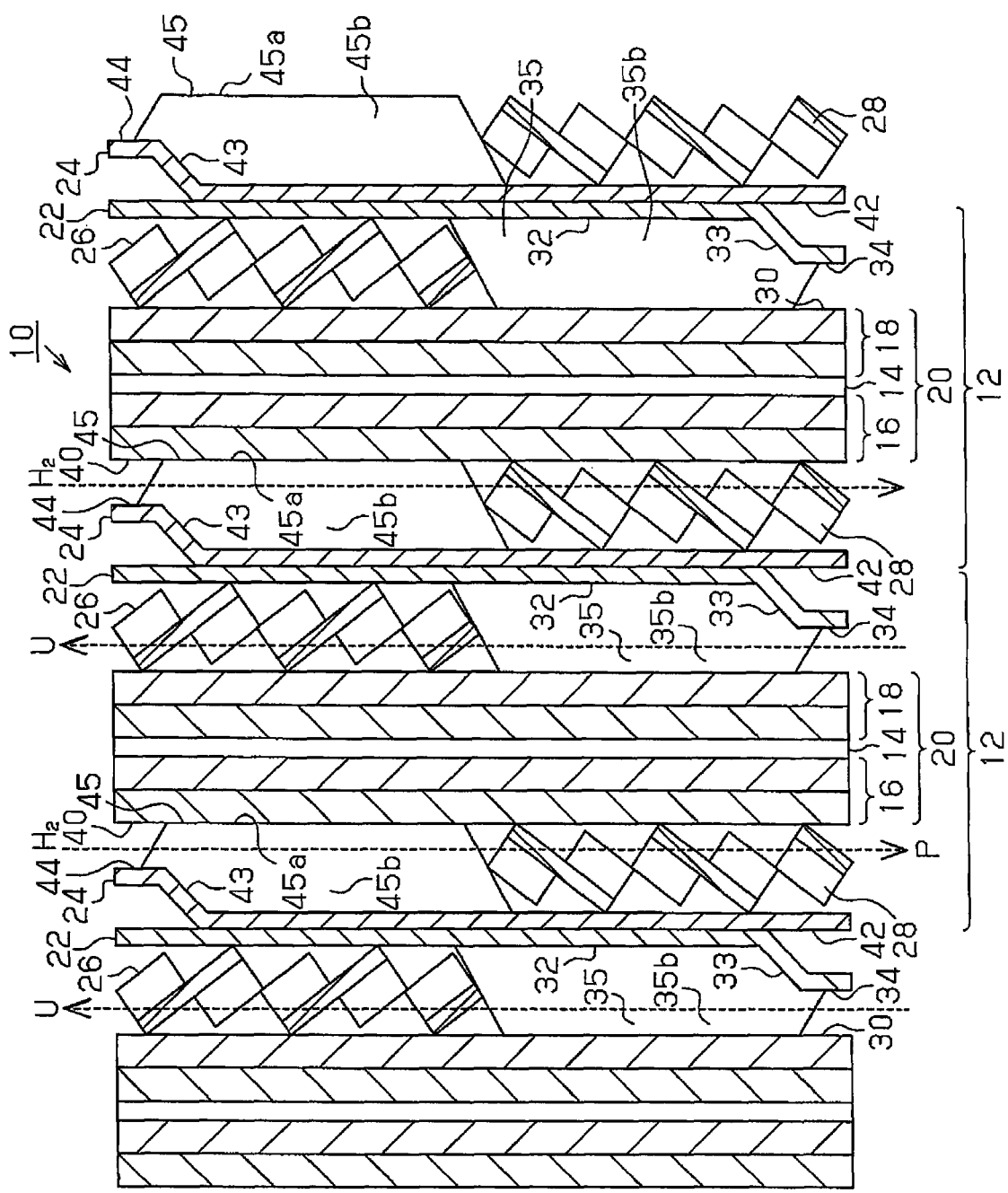
FIG. 2 is a vertical sectional view of the fuel battery shown in FIG. 1 cut along a vertical plane passing between elongated protrusions provided on separators.

As shown in FIG. 2, each unit cell 12 includes a membrane-electrode assembly (MEA) 20, in which a solid polymer electrolyte membrane 14 is provided between an anode 16 and a cathode 18. The MEA 20 is arranged between a first separator 22 and a second separator 24. A first gas diffusion porous body 26 is arranged between the first separator 22 and the MEA 20. A second gas diffusion porous body 28 is arranged between the second separator 24 and the MEA 20.

In the MEA 20, the anode 16, which is a fuel electrode, is arranged on one surface of the electrolyte membrane 14 and the cathode 18, which is an oxygen electrode, is arranged on the other surface of the electrolyte membrane 14.

The electrolyte membrane 14 is formed of a solid polymer material having good proton conductivity in a wet state. Examples of such a solid polymer material include a fluorinated polymer membrane (e.g. Nafion membrane produced by Du Pont).

The anode 16 includes an electrode catalyst layer 16a and a gas diffusion layer 16b. The cathode 18 includes an electrode catalyst layer 18a and a gas diffusion layer 18b. The electrode catalyst layers 16a, 18a are in contact with the electrolyte membrane 14 and formed of electrically conductive carbon black carrying platinum fine particles. The gas diffusion layers 16b, 18b are laminated on the electrode catalyst layers 16a, 18a and formed of electrically conductive carbon paper. Platinum contained in the electrode catalyst layers 16a, 18a promotes a reaction to separate hydrogen into protons and electrons and a reaction to produce water from oxygen, protons, and electrons. A similarly working catalyst may be used instead of platinum. Further, the gas diffusion layers 16b, 18b may be formed of a material other than carbon paper as long as this material has sufficient gas diffusivity and electrical conductivity. For example, the gas diffusion layers 16b, 18b may be formed of a carbon cloth or carbon felt made of carbon fibers.

(First Separator 22 and Oxidant Gas Flow Passage 30)

The first separator 22 is made of titanium and electrically conductive. However, the material of the first separator 22 is not limited to titanium. The first separator 22 may be formed of another electrically conductive material based on carbon or metal. As shown in FIG. 2, an oxidant gas flow passage 30 is formed between the first separator 22 and the MEA 20 of each unit cell 12. The oxidant gas flow passage 30 is connected to the oxidant gas supply port and the oxidant gas discharge port provided on the fuel battery 10 via unillustrated manifold holes.

Figure 1:
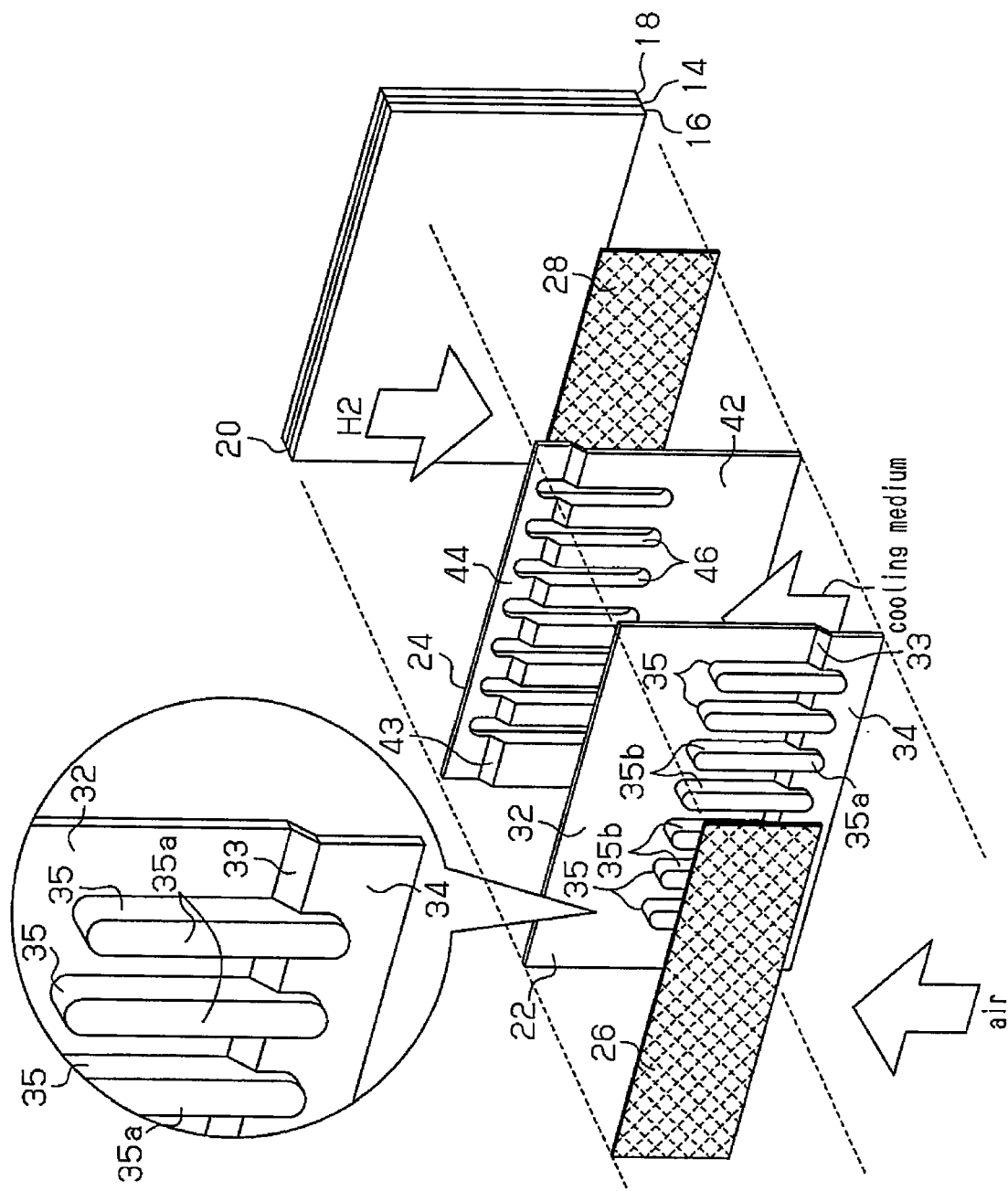
FIG. 1 is an exploded perspective view showing a part of a fuel battery according to a first embodiment of the present invention.

As shown in FIG. 1, each first separator 22 includes a large-size flat plate portion 32 located on the downstream side of the oxidant gas flow passage 30 and a small-size flat plate portion 34 located on the upstream side of the oxidant gas flow passage 30. The two flat plate portions 32, 34 of each first separator 22 are parallel to each other and are connected to and integrated with each other by a step portion 33. As shown in FIG. 2, the large-size flat plate portion 32 of the first separator 22 of each unit cell 12 is located substantially in the center between the MEA 20 of the same unit cell 12 and the MEA 20 of a unit cell 12 adjacent to the same unit cell 12. The length of the small-size flat plate portion 34 of each first separator 22 in the flowing direction of the oxidant gas in the oxidant gas flow passage 30, i.e. the length thereof in a first direction indicated by broken-line arrows U in FIG. 2, is shorter than that of the large-size flat plate portion 32 of the same first separator 22. The step portion 33 is inclined with respect to the first direction U.

Figure 5:
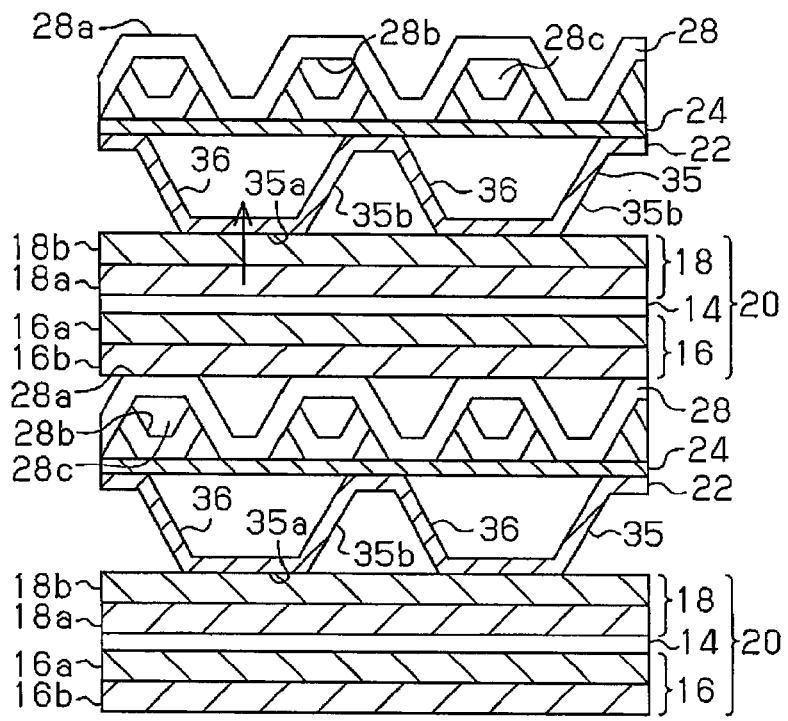
FIG. 5 is a horizontal sectional view of the fuel battery shown in FIG. 1 cut along a horizontal plane passing through upstream sections of oxidant gas flow passages.

As shown in FIGS. 1 and 5, each first separator 22 includes a plurality of elongated protrusions 35 extending in parallel to the first direction U. The elongated protrusions 35 of the first separator 22 of each unit cell 12 are formed to project toward the MEA 20 of the same unit cell 12 by mold pressing. The elongated protrusions 35 of each first separator 22 extend from a substantial center of the large-size flat plate portion 32 in the first direction U to a substantial center of the small-size flat plate portion 34 in the first direction U across the step portion 33.

The elongated protrusions 35 of each first separator 22 adjacent to each other are preferably arranged at equal intervals, but may be arranged at unequal intervals in some cases.

Figure 3:
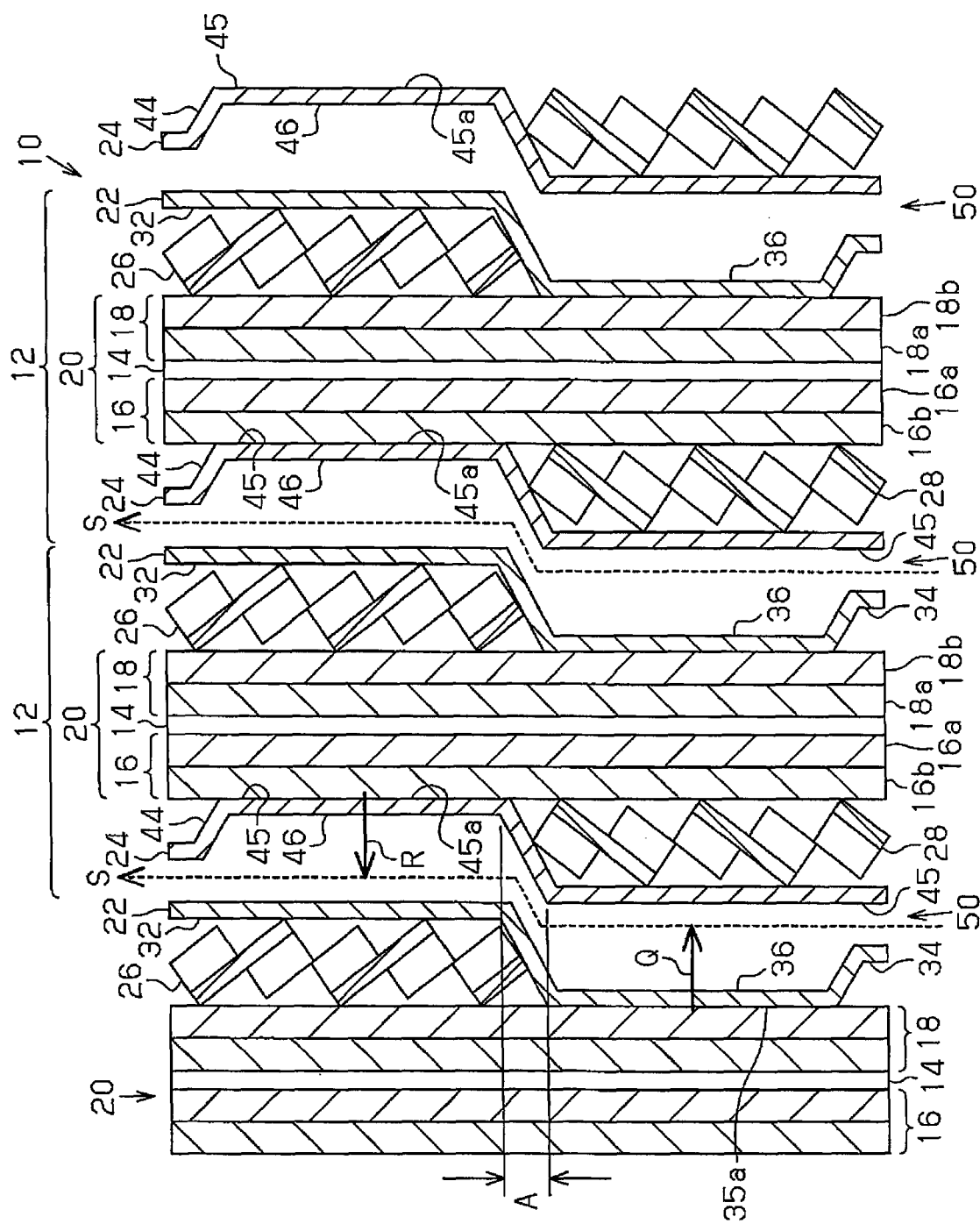
FIG. 3 is a vertical sectional view of the fuel battery shown in FIG. 1 cut along a vertical plane passing through the elongated protrusions provided on the separators.

By forming the elongated protrusions 35 by pressing, as shown in FIG. 5, the first separator 22 of each unit cell 12 includes a plurality of grooves 36 extending in parallel to the first direction U on a surface thereof opposite to the one facing the MEA 20 of the unit cell 12. Further, as shown in FIGS. 1 and 5, first grooves 35b are formed respectively between the elongated protrusions 35 of each first separator 22 adjacent to each other. A part of each elongated protrusion 35 that faces the MEA 20 is formed as a flat wall portion 35a as shown in FIGS. 1 and 5 and is held in close contact with the cathode 18 (gas diffusion layer 18b) of the MEA 20 in the upstream section of the oxidant gas flow passage 30 as shown in FIGS. 3 and 5.

The upstream section of each oxidant gas flow passage 30 is formed as a plurality of groove flow passages independent of each other by providing the first grooves 35b on a surface of the first separator 22 that faces the MEA 20. The first gas diffusion porous body 26 is arranged in the downstream section of each oxidant gas flow passage 30.

(Second Separator 24 and Fuel Gas Flow Passage 40)

The second separator 24 is made of titanium and electrically conductive. However, the material of the second separator 24 is not limited to titanium. The second separator 24 may be formed of another electrically conductive material based on carbon or metal.

As shown in FIG. 2, a fuel gas flow passage 40 is formed between the second separator 24 and the MEA 20 of each unit cell 12. In the present embodiment, the flowing direction of the oxidant gas in the oxidant gas flow passage 30 and that of the fuel gas in the fuel gas flow passage 40 are opposite to each other. Specifically, the oxidant gas and the fuel gas flow to form countercurrent flows. The fuel gas flow passage 40 is connected to the fuel gas supply port and the fuel gas discharge port provided on the fuel battery 10 via unillustrated manifold holes.

As shown in FIG. 1, each second separator 24 includes a large-size flat plate portion 42 located on the downstream side of the fuel gas flow passage 40 and a small-size flat plate portion 44 located on the upstream side of the fuel gas flow passage 40. The two flat plate portions 42, 44 of each second separator 24 are parallel to each other and are connected to and integrated with each other by a step portion 43. As shown in FIG. 2, the large-size flat plate portion 42 of the second separator 24 of each unit cell 12 is located substantially in the center between the MEA 20 of the same unit cell 12 and the MEA 20 of a unit cell 12 adjacent to the same unit cell 12. The length of the small-size flat plate portion 44 of each second separator 24 in the flowing direction of the fuel gas in the fuel gas flow passage 40, i.e. the length thereof in a second direction indicated by broken-line arrows P in FIG. 2, is shorter than that of the large-size flat plate portion 42 of the same second separator 24. The step portion 43 is inclined with respect to the second direction P. In the present embodiment, the second direction P is 180° opposite to the first direction U.

As shown in FIGS. 2 and 3, each second separator 24 includes a plurality of elongated protrusions 45 extending in parallel to the second direction P. The number and interval of the elongated protrusions 45 provided on each second separator 24 are the same as those of the elongated protrusions 35 provided on each first separator 22. The first separator 22 and the second separator 24 are so arranged that the elongated protrusions 35 and the elongated protrusions 45 respectively conform to each other.

The elongated protrusions 45 of the second separator 24 of each unit cell 12 are formed to project toward the MEA 20 of the same unit cell 12 by mold pressing. The elongated protrusions 45 of each second separator 24 extend from a substantial center of the large-size flat plate portion 42 in the second direction P to a substantial center of the small-size flat plate portion 44 in the second direction P across the step portion 43.

By forming the elongated protrusions 45 by pressing, as shown in FIG. 1, the second separator 24 of each unit cell 12 includes a plurality of grooves 46 extending in parallel to the second direction P on a surface thereof opposite to the one facing the MEA 20 of the unit cell 12. Further, as shown in FIG. 2, second grooves 45b are formed respectively between the elongated protrusions 45 of each second separator 24 adjacent to each other.

A part of each elongated protrusion 45 that faces the MEA 20 is formed as a flat wall portion 45a as shown in FIGS. 2 and 3 and held in close contact with the anode 16 (gas diffusion layer 16b) of the MEA 20 in the upstream section of the fuel gas flow passage 40.

The upstream section of each fuel gas flow passage 40 is formed as a plurality of groove flow passages independent of each other by providing the second grooves 45b on a surface of the second separator 24 that faces the MEA 20. The second gas diffusion porous body 28 is arranged in the downstream section of each fuel gas flow passage 40.

As shown in FIG. 2, the large-size flat plate portion 42 of the second separator 24 of each unit cell 12 is held in close contact with and electrically connected to the large-size flat plate portion 32 of the first separator 22 of a unit cell 12 adjacent to the same unit cell 12.

Further, the grooves 46 of the second separator 24 of each unit cell 12 communicate with the grooves 36 of the first separator 22 of a unit cell 12 adjacent to the same unit cell 12 in an overlapping manner at a part indicated by reference symbol A in FIG. 3.

(Cooling Medium Flow Passage 50)

A cooling medium flow passage 50 is formed by the first separator 22 of each unit cell 12 and the second separator 24 of a unit cell 12 adjacent to the same unit cell 12, more specifically by the grooves 36 provided on the first separator 22 and the grooves 46 provided on the second separator 24. A clearance between the small-size flat plate portion 34 of the first separator 22 and the large-size flat plate portion 42 of the second separator 24 functions as the inlet of the cooling medium flow passage 50, and a clearance between the small-size flat plate portion 44 of the second separator 24 and the large-size flat plate portion 32 of the first separator 22 functions as the outlet of the cooling medium flow passage 50.

As shown in FIG. 3, the upstream section of each cooling medium flow passage 50, i.e. the grooves 36, is located closer to a surface of the MEA 20 that faces the oxidant gas flow passage 30 adjacent to the cooling medium flow passage 50 as compared with the downstream section of the cooling medium flow passage 50, i.e. the grooves 46. In other words, the upstream section of each cooling medium flow passage 50 is located close to the MEA 20 of the unit cell 12 including a first separator 22 that is one of the first and second separators 22, 24 forming the cooling medium flow passage 50. Further, the downstream section of each cooling medium flow passage 50, i.e. the grooves 46, is located closer to a surface of the MEA 20 that faces the fuel gas flow passage 40 adjacent to the cooling medium flow passage 50 as compared with the upstream section of the cooling medium flow passage 50, i.e. the grooves 36. In other words, the downstream section of each cooling medium flow passage 50 is located close to the MEA 20 of the unit cell 12 including a second separator 24 that is one of the first and second separators 22, 24 forming the cooling medium flow passage 50.

The cooling medium flow passage 50 is connected to the cooling medium supply port and the cooling medium discharge port provided on the fuel battery 10 via unillustrated manifold holes. The flowing direction of the cooling medium such as cooling water in the cooling medium flow passage 50 indicated by broken-line arrows S in FIG. 3 is the same as the flowing direction of the oxidant gas in the oxidant gas flow passage 30. Specifically, the cooling medium and the oxidant gas flow to form mutually parallel flows (co-flows).

By forming the cooling medium flow passage 50 as described above, a part of the cathode 18 located in the upstream section of the oxidant gas flow passage 30 is efficiently cooled by the upstream section of the cooling medium flow passage 50, whereas a part of the anode 16 located in the upstream section of the fuel gas flow passage 40 is efficiently cooled by the downstream section of the cooling medium flow passage 50. In the present embodiment, instead of uniformly cooling the respective cathode 18 and anode 16 in their entirety, a part of the cathode 18 located near the inlet of the oxidant gas flow passage 30, which is most likely to become dry, i.e. a part of the cathode located in the upstream section of the oxidant gas flow passage 30 can be actively cooled as just described.

(Gas Diffusion Porous Bodies 26, 28)

Figure 4:
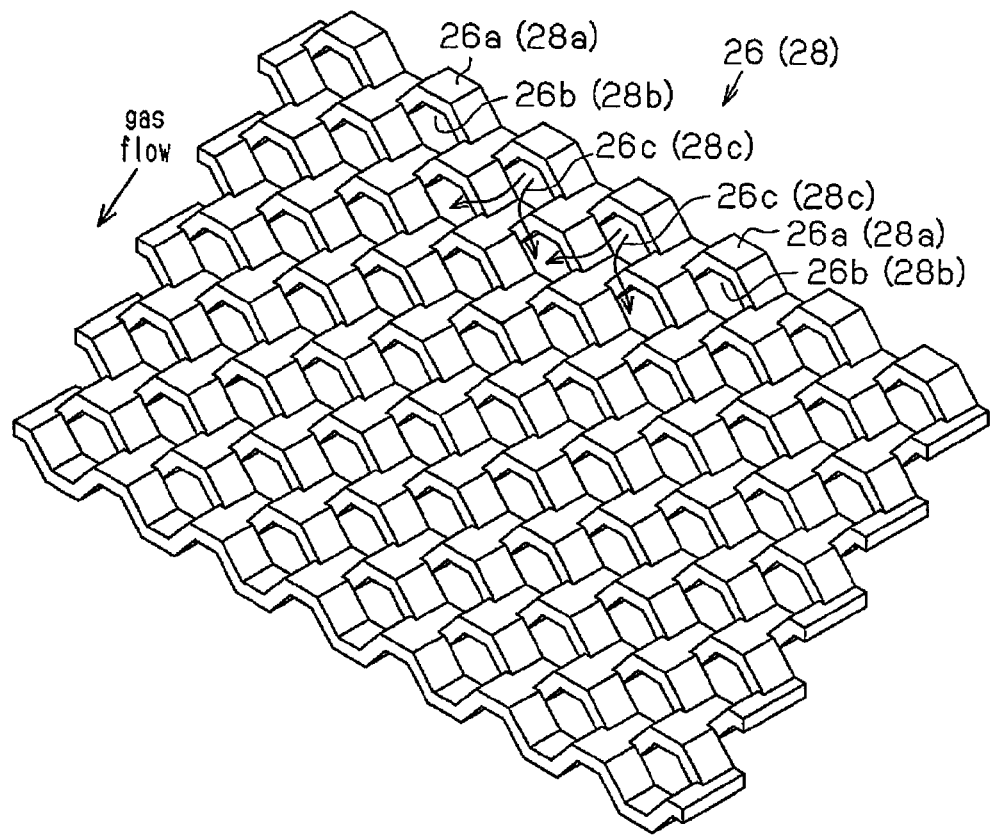
FIG. 4 is a perspective view of a gas diffusion porous body of the fuel battery shown in FIG. 1.

Next, the gas diffusion porous bodies 26, 28 are described. FIG. 4 is a perspective view showing a part of the first gas diffusion porous body 26. The second gas diffusion porous body 28 also has the same configuration as the first gas diffusion porous body 26.

Each gas diffusion porous body 26, 28 is formed of a metal lath in which a multitude of hexagonal ring portions 26a, 28a are provided in a staggered manner as shown in FIG. 4. Each gas diffusion porous body 26, 28 is so arranged in the oxidant gas flow passage 30 or the fuel gas flow passage 40 that the axes of through holes 26b, 28b of the ring portions 26a, 28a intersect the first direction U or the second direction P. Thus, the oxidant gas or the fuel gas is diffused in the oxidant gas flow passage 30 or the fuel gas flow passage 40 by passing through gas flow passages 26c, 28c of the gas diffusion porous body 26, 28, which are the through holes 26b, 28b of the ring portions 26a, 28a.

The first gas diffusion porous body 26 of each unit cell 12 is held in contact with the cathode 18 and the first separator 22 of the same unit cell 12 to electrically connect the cathode 18 and the first separator 22. The second gas diffusion porous body 28 of each unit cell 12 is held in contact with the anode 16 and the second separator 24 of the same unit cell 12 to electrically connect the anode 16 and the second separator 24.

Next, operation of the fuel battery 10 of the present embodiment will be described.

When the fuel battery 10 generates power, the oxidant gas (air in the present embodiment) and the fuel gas (hydrogen gas in the present embodiment) pass through the oxidant gas flow passage 30 and the fuel gas flow passage 40, respectively, to form countercurrent flows as shown in FIG. 2. Further, the cooling medium (cooling water in the present embodiment) passes through the cooling medium flow passage 50 in the same direction as the flowing direction of the oxidant gas in the oxidant gas flow passage 30.

As shown in FIG. 3, the cooling medium enters the cooling medium flow passage 50 through the clearance between the small-size flat plate portion 34 of the first separator 22 and the large-size flat plate portion 42 of the second separator 24 and first passes through the grooves 36. By the passage of the cooling medium through the grooves 36, a part of the cathode 18 located in the upstream section of the oxidant gas flow passage 30 is cooled via the wall portions 35a. Arrow Q in FIG. 3 indicates a heat transfer direction from the cathode 18.

Subsequently, the cooling medium passes through the grooves 46. By the passage of the cooling medium through the grooves 46, a part of the anode 16 located in the upstream section of the fuel gas flow passage 40 is cooled via the wall portions 45a. Arrow R in FIG. 3 indicates a heat transfer direction from the anode 16. Thereafter, the cooling medium exits the cooling medium flow passage 50 through the clearance between the small-size flat plate portion 44 of the second separator 24 and the large-size flat plate portion 32 of the first separator 22. As described, in the present embodiment, a part of the cathode 18 located in the upstream section of the oxidant gas flow passage 30 is more actively cooled than a part of the cathode 18 located in the downstream section of the oxidant gas flow passage 30. Further, a part of the anode 16 located in the upstream section of the fuel gas flow passage 40 is more actively cooled than a part of the anode 16 located in the downstream section of the fuel gas flow passage 40.

Generally, in the case of operating the fuel battery by supplying non-humidified fuel gas and oxidant gas, i.e. in the case of a non-humidified operation, the in-plane distribution of moisture in each unit cell 12 of the fuel battery 10 is likely to be uneven. More specifically, the vicinity of the inlet (upstream section) of the oxidant gas flow passage 30 tends to become dry and the vicinity of the outlet (downstream section) of the oxidant gas flow passage 30 tends to become wet. Thus, the moisture content within the plane of each unit cell 12 needs to be made uniform.

In the present embodiment, the high-temperature performance of the fuel battery 10 is improved by actively cooling the vicinities of the inlets (upstream sections) of the oxidant gas flow passages 30 as described above.

In the downstream section of the oxidant gas flow passage 30, an oxygen concentration decreases as oxygen in the oxidant gas is consumed by power generation and water is produced due to a reaction on the cathode 18. The produced water is discharged to the outside of the oxidant gas flow passage 30 with the help of the oxidant gas (oxidant off-gas) flowing in the oxidant gas flow passage 30 through the gas flow passages 26c of the first gas diffusion porous body 26. Since the first gas diffusion porous body 26 is arranged in the downstream section of the oxidant gas flow passage 30, a hindrance of gas diffusion in the gas diffusion layer 18b by the produced water is suppressed. As a result, the power generation performance of the fuel battery 10 is improved. Further, since drainability is improved in the downstream section of the oxidant gas flow passage 30, voltage stability in an ordinary temperature range is improved.

A part of the produced water permeates through the electrolyte membrane 14 and percolates into the electrode catalyst layer 16a and the gas diffusion layer 16b of the anode 16 and the second gas diffusion porous body 28 in the fuel gas flow passage 40. The percolating water is discharged to the outside of the fuel gas flow passage 40 with the help of the fuel gas (fuel off-gas) flowing in the fuel gas flow passage 40 through the gas flow passages 28c of the second gas diffusion porous body 28.

The present embodiment has the following advantages.

(1) In the case of the fuel battery 10 of the present embodiment, the oxidant gas flow passage 30 includes the upstream section formed as the groove flow passages and the downstream section in which the gas diffusion porous body 26 is arranged. The fuel gas flow passage 40 includes the upstream section formed as the groove flow passages and the downstream section in which the gas diffusion porous body 28 is arranged. The cooling medium flow passage 50 is formed between the first separator 22 of each unit cell 12 and the second separator 24 of a unit cell 12 adjacent to the same unit cell 12. The flowing direction of the cooling medium in the cooling medium flow passage 50 is the same as that of the oxidant gas in the oxidant gas flow passage 30. The upstream section of the cooling medium flow passage 50 is located closer to a surface of the MEA 20 that faces the oxidant gas flow passage adjacent to the cooling medium flow passage 50 as compared with the downstream section of the cooling medium flow passage 50. Thus, according to the fuel battery 10 of the present embodiment, high-temperature performance, operational performance under high temperature and no humidity, and power generation performance are improved. Further, since the drainability and gas diffusivity are good in the downstream section of the oxidant gas flow passage, where the moisture content is particularly high, voltage stability in the ordinary temperature range is improved. As a result of improvements in operational performance under high temperature and no humidity, and power generation performance, the size and costs of the fuel battery 10 can be reduced.

Further, in the case of the fuel battery 10 of the present embodiment, the gas diffusion porous bodies 26, 28 are arranged only in the downstream sections of the respective oxidant gas flow passage 30 and fuel gas flow passage 40. Thus, the fuel battery 10 can be made lighter as compared with the case in which gas diffusion porous bodies are arranged to correspond to the entire surfaces of the respective anode 16 and cathode 18.

(2) In the case of the fuel battery 10 of the present embodiment, the first separator 22 of each unit cell 12 is held in contact with the cathode 18 of the MEA 20 of the same unit cell 12 at a part corresponding to the upstream section of the cooling medium flow passage 50. Thus, the upstream section of the oxidant gas flow passage 30 can be efficiently cooled by the cooling medium flowing in the cooling medium flow passage 50 and high-temperature performance, operational performance under high temperature and no humidity, and power generation performance can be further improved.

Second Embodiment

Next, a fuel battery according to a second embodiment of the present invention will be described with reference to FIGS. 7(a), 7(b), and 8. The fuel battery of the second embodiment differs from the fuel battery 10 of the first embodiment in that first and second gas diffusion porous bodies 70, 80 shown in FIG. 7(a) are used instead of the first and second gas diffusion porous bodies 26, 28 shown in FIG. 4. Components of the fuel battery of the second embodiment identical to or corresponding to those of the fuel battery 10 of the first embodiment (excluding the first and second gas diffusion porous bodies 70, 80) are denoted by the same reference numerals used in the description of the first embodiment.

As shown in FIG. 7(a), the first and second gas diffusion porous body 70, 80 includes a flat plate portion 72, 82 with a multitude of cut-and-raised sections having a substantially S-shaped cross-section. Each cut-and-raised section is integrally formed with the flat plate portion 72, 82 and forms a first protrusion 74, 84 and a second protrusion 76, 86. The first protrusion 74, 84 is a part of the cut-and-raised section that projects from one surface of the flat plate portion 72, 82 and has a flat trapezoidal cross-section. The cross-sectional shape of the first protrusion 74, 84 may be semicircular. The second protrusion 76, 86 is another part of the cut-and-raised sections that projects from the other surface of the flat plate portion 72, 82 and has a semicircular cross-section. The cross-sectional shape of the second protrusion 76, 86 may be trapezoidal. A height of the second protrusion 76, 86 is smaller than that of the first protrusion 74, 84.

As shown in FIG. 8, the first gas diffusion porous body 70 is so arranged in the downstream section of an oxidant gas flow passage 30 that the first protrusions 74 are in contact with a gas diffusion layer 18b of a cathode 18 and the second protrusions 76 are in contact with a first separator 22. Similarly, the second gas diffusion porous body 80 is so arranged in the downstream section of a fuel gas flow passage 40 that the second protrusions 84 are in contact with a gas diffusion layer 16b of an anode 16 and the second protrusions 86 are in contact with a second separator 24.

As shown in FIGS. 7(a) and 8, a clearance having a width equal to the height of the second protrusions 76 is formed between the first separator 22 and the first gas diffusion porous body 70, more accurately between the first separator 22 and the flat plate portion 72 of the first gas diffusion porous body 70. This clearance functions as a first water flow passage 78 for discharging water in the oxidant gas flow passage 30 from the oxidant gas flow passage 30. Specifically, the downstream section of the oxidant gas flow passage 30 is partitioned into the first water flow passage 78 and the other part by the flat plate portion 72. The first water flow passage 78 communicates with the other part of the oxidant gas flow passage 30 through recesses 75 formed as the first protrusions 74 are formed by cutting and raising. The width of the first water flow passage 78 is, for example, 5 μm to 30 μm and smaller than the width of the other part of the oxidant gas flow passage 30, e.g. 100 μm to 500 μm. Water produced by a reaction on the cathode 18 moves into the first water flow passage 78 through the recesses 75 by capillary action. Then, as oxidant gas flows in the oxidant gas flow passage 30 in a first direction U, the water moves in the first water flow passage 78 in the same direction, i.e. an arrow direction in FIG. 7(b) and is discharged from the oxidant gas flow passage 30.

Similarly, a clearance having a width equal to the height of the second protrusions 86 is formed between the second separator 24 and the second gas diffusion porous body 80, more accurately between the second separator 24 and the flat plate portion 82 of the second gas diffusion porous body 80. This clearance functions as a second water flow passage 88 for discharging water in the fuel gas flow passage 40 from the fuel gas flow passage 40. Specifically, the downstream section of the fuel gas flow passage 40 is partitioned into the second water flow passage 88 and the other part by the flat plate portion 82. The second water flow passage 88 communicates with the other part of the fuel gas flow passage 40 through recesses 85 formed as the second protrusions 84 are formed by cutting and raising. The width of the second water flow passage 88 is, for example, 5 μm to 30 μm and smaller than the width of the other part of the fuel gas flow passage 40, e.g. 100 μm to 500 μm. Water having permeated through an electrolyte membrane 14 and percolated into the fuel gas flow passage 40 after being produced by a reaction on the cathode 18 moves into the second water flow passage 88 through the recesses 85 by capillary action. Then, as fuel gas flows in the fuel gas flow passage 40 in a second direction P, the water moves in the second water flow passage 88 in the same direction, i.e. in a direction opposite to the arrow direction in FIG. 7(b) and is discharged from the fuel gas flow passage 40.

The second embodiment has the following advantages.

(1) In the case of the fuel battery of the second embodiment, the first water flow passage 78 is provided between the first separator 22 and the first gas diffusion porous body 70 of each unit cell 12 and water in the oxidant gas flow passage 30 moves in the first water flow passage 78 in the same direction as the flowing direction of the oxidant gas and is discharged from the oxidant gas flow passage 30 as the oxidant gas flows in the oxidant gas flow passage 30. In this way, the drainability of the oxidant gas flow passage 30 is improved. As a result, the oxidant gas flowing in the oxidant gas flow passage 30 is stably supplied while being properly diffused to an electrode catalyst layer 18a of the cathode 18. Further, the pressure loss in the oxidant gas flow passage 30 is reduced. By these, the power generation efficiency of the fuel battery is improved. Further, voltage stability in an ordinary temperature range, where the retention of water produced by a reaction on the cathode 18 is likely to occur, is also improved.

(2) In the case of the fuel battery of the second embodiment, the second water flow passage 88 is provided between the second separator 24 and the second gas diffusion porous body 80 of each unit cell 12 and water in the fuel gas flow passage 40 moves in the second water flow passage 88 in the same direction as the flowing direction of the fuel gas and is discharged from the fuel gas flow passage 40 as the fuel gas flows in the fuel gas flow passage 40. In this way, the drainability of the fuel gas flow passage 40 is improved. As a result, the fuel gas flowing in the fuel gas flow passage 40 is stably supplied while being properly diffused to an electrode catalyst layer 16a of the anode 16. Further, the pressure loss in the fuel gas flow passage 40 is reduced. By these, the power generation efficiency of the fuel battery is improved. Further, it is also possible to avoid the occurrence of corrosion in the electrode catalyst layer 16a due to a potential increase caused when the supply of the fuel gas to the electrode catalyst layer 16a of the anode 16 lacks.

Third Embodiment

Figure 9:
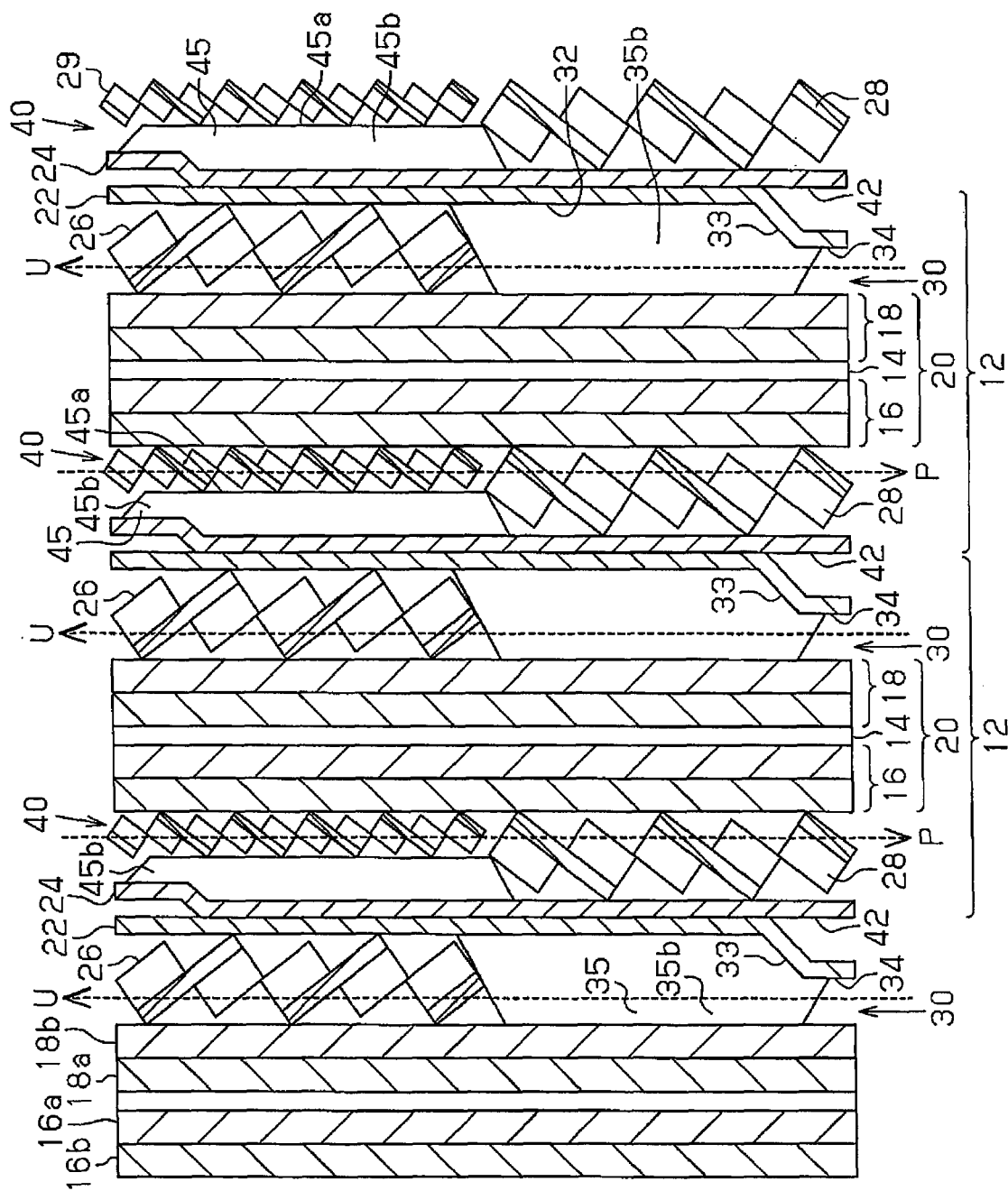
FIG. 9 is a vertical sectional view of a fuel battery according to a third embodiment of the present invention cut along a vertical plane passing between elongated protrusions provided on separators.

Next, a fuel battery according to a third embodiment of the present invention will be described with reference to FIGS. 9 and 10. The differences from the fuel battery 10 of the first embodiment will mainly be discussed.

The fuel battery 10 of the first embodiment is so configured that the wall portions 45a of the elongated protrusions 45 provided on the second separator 24 are in contact with the anode 16 of the MEA 20. In contrast, in the fuel battery of the third embodiment, wall portions 45a of elongated protrusions 45 of a second separator 24 are separated from an anode 16 as shown in FIG. 9. A third gas diffusion porous body 29 is arranged in a clearance between the wall portions 45a and the anode 16, i.e. in the upstream section of a fuel gas flow passage 40. The third gas diffusion porous body 29 differs from a second gas diffusion porous body 28 located in a downstream section of the fuel gas flow passage 40 only in thickness and is so configured that a multitude of hexagonal ring portions are provided in a staggered manner similarly to the second gas diffusion porous body 28. The third gas diffusion porous body 29 of each unit cell 12 is held in contact with the anode 16 and the second separator 24 of the same unit cell 12 to electrically connect the anode 16 and the second separator 24.

Accordingly, in the fuel battery of the third embodiment, not only the second gas diffusion porous body 28 is provided in the downstream section of the fuel gas flow passage 40, but also the third gas diffusion porous body 29 is provided in the upstream section of the fuel gas flow passage 40. Further, similarly to the fuel battery 10 of the first embodiment, a plurality of second grooves 45b are provided on a surface of the second separator 24 that faces a MEA 20 in the upstream section of each fuel gas flow passage 30.

Similarly to the fuel battery 10 of the first embodiment, the flowing direction of oxidant gas in an oxidant gas flow passage 30 and that of fuel gas in the fuel gas flow passage 40 are opposite to each other.

Figure 10:
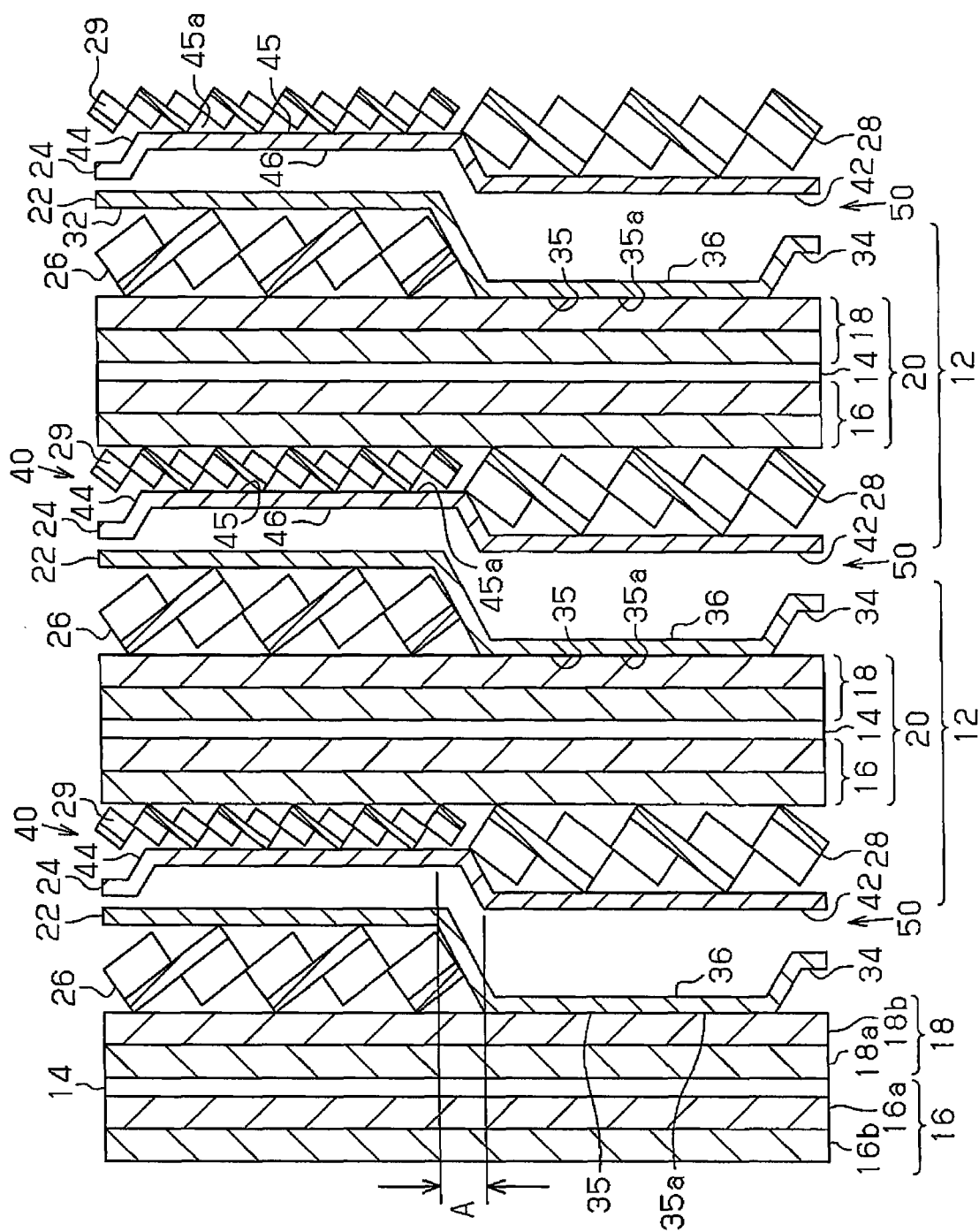
FIG. 10 is a vertical sectional view of the fuel battery of the third embodiment cut along a vertical plane passing through the elongated protrusions provided on the separators.

Further, grooves 46 of the second separator 24 of each unit cell 12 communicate with grooves 36 of a first separator 22 of a unit cell 12 adjacent to the same unit cell 12 in an overlapping manner at a part indicated by reference symbol A in FIG. 10, whereby a cooling medium flow passage 50 is formed. Similarly to the fuel battery 10 of the first embodiment, the flowing direction of a cooling medium such as cooling water in the cooling medium flow passage 50 is the same as that of the oxidant gas in the oxidant gas flow passage 30.

The third embodiment has the following advantage in addition to advantages (1) and (2) of the first embodiment.

(1) In the case of the fuel battery of the third embodiment, not only the second gas diffusion porous body 28 is provided in the downstream section of the fuel gas flow passage 40, but also the third gas diffusion porous body 29 is provided in the upstream section of the fuel gas flow passage 40. Thus, the fuel gas can be uniformly diffused not only in the upstream section of the fuel gas flow passage 40, but also in the downstream section thereof. Water having permeated through an electrolyte membrane 14 and percolated into the fuel gas flow passage 40 after being produced by a reaction on the cathode 18 is discharged from the fuel gas flow passage 40 with the help of the fuel gas (fuel off-gas) flowing through the third gas diffusion porous body 29 and the second gas diffusion porous body 28.

The above embodiments may be modified as follows.

In the third embodiment, the flowing direction of the fuel gas in the fuel gas flow passage 40 may be changed to be the same as that of the oxidant gas in the oxidant gas flow passage 30, i.e. the first direction U. In this case, the second gas diffusion porous body 28 is arranged in the upstream section of the fuel gas flow passage 40, and the third gas diffusion porous body 29 is arranged in the downstream section of the fuel gas flow passage 40. Further, the second grooves 45b provided on the second separator 24 are located in the downstream section of the fuel gas flow passage 40. Also in the case of this modification, advantages similar to those of the third embodiment are obtained.

Figure 11:
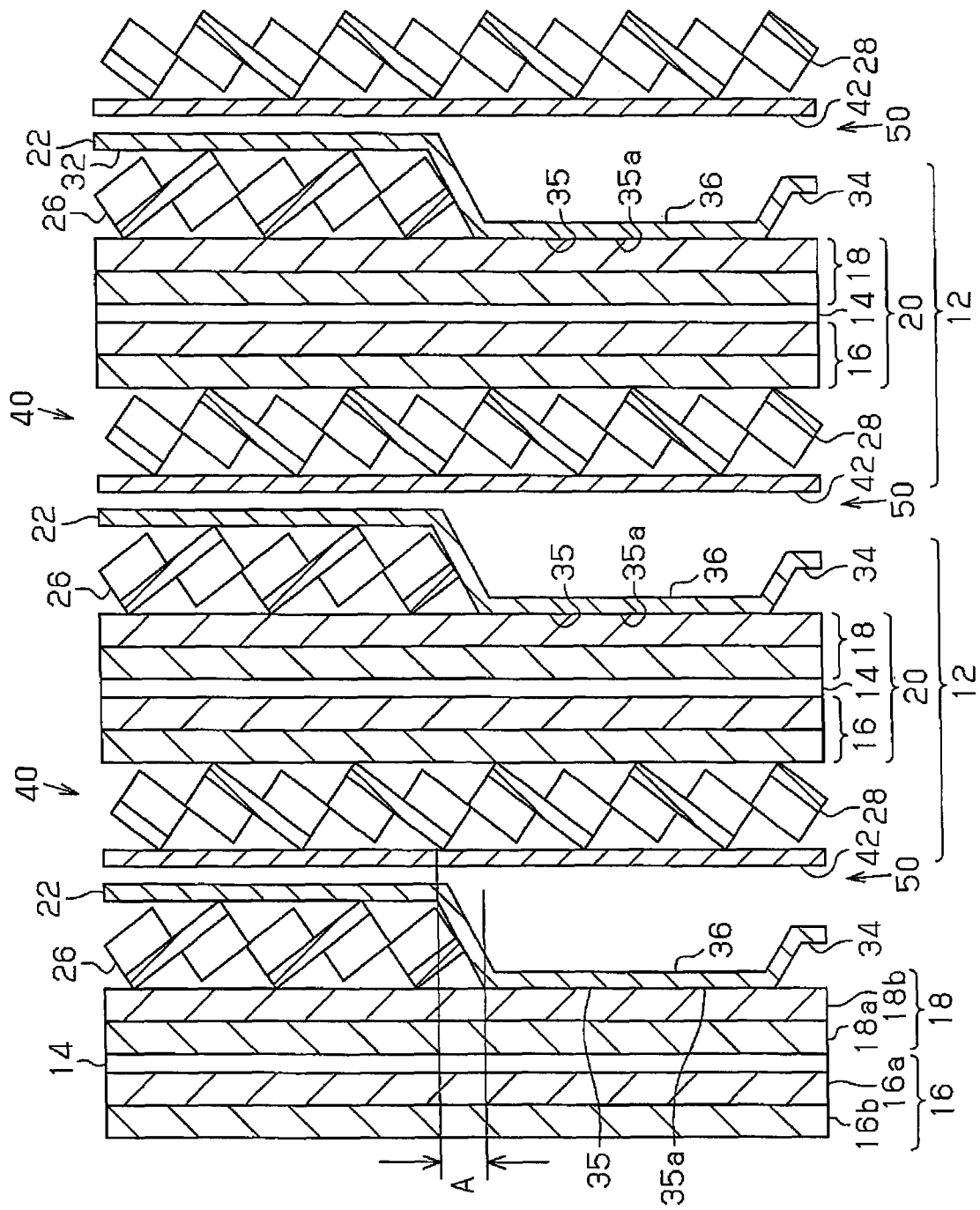
FIG. 11 is a vertical sectional view of a fuel battery according to a modification of the present invention cut along a vertical plane passing through elongated protrusions provided on separators.
Figure 12:
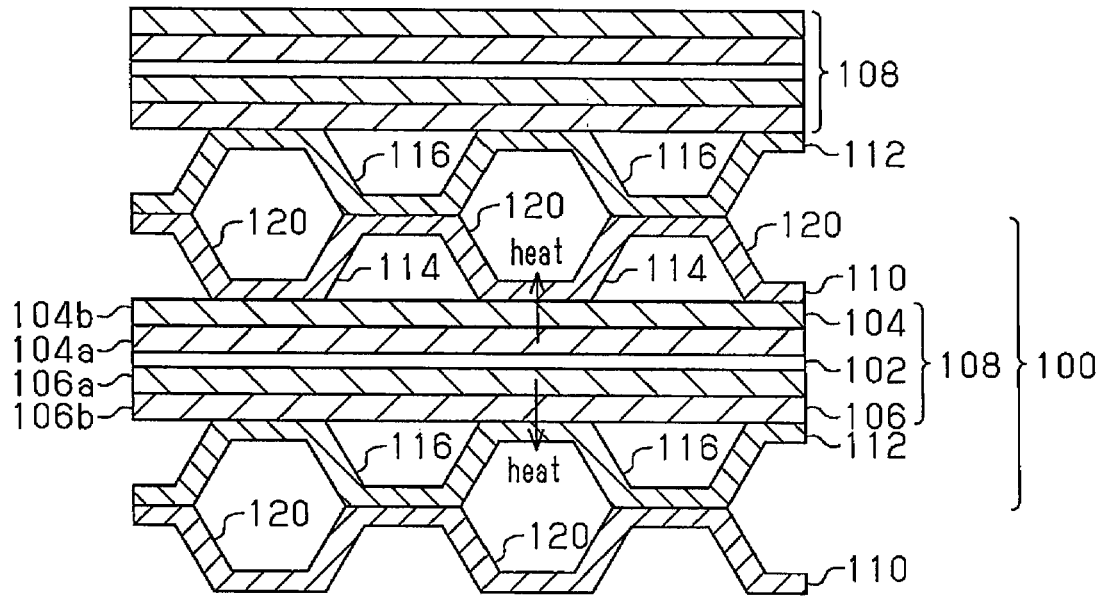
FIG. 12 is a horizontal sectional view of a conventional fuel battery.
Figure 13:
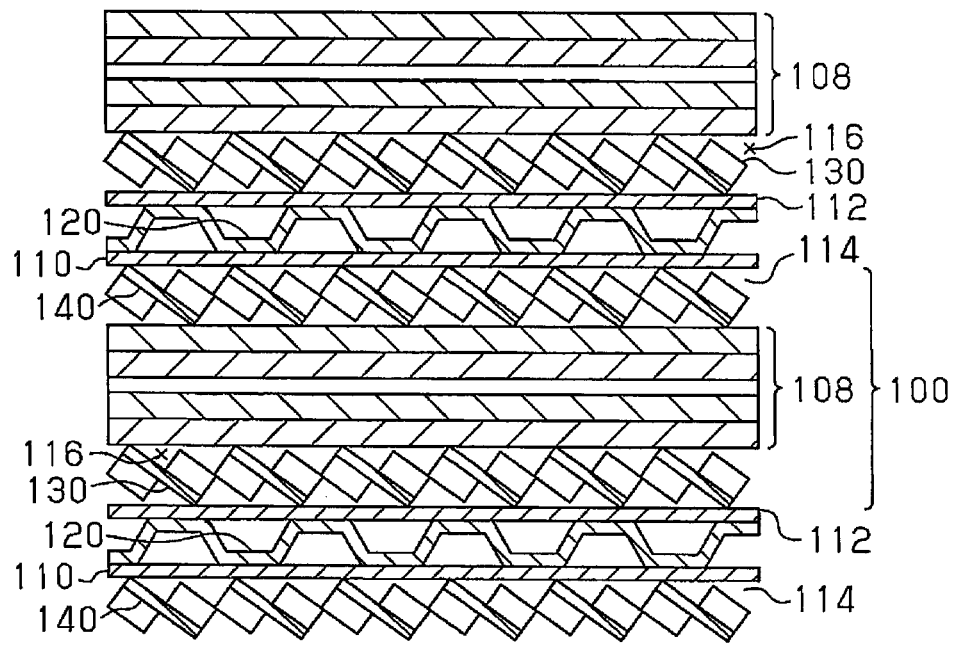
FIG. 13 is a horizontal sectional view of another conventional fuel battery.

The above modification may be further changed as follows to have a configuration as shown in FIG. 11. Specifically, the second grooves 45b of the second separator 24 are omitted. Further, the third gas diffusion porous body 29 is omitted and, instead, the second gas diffusion porous body 28 is changed in size to be located both in the upstream section and the downstream section of the fuel gas flow passage 40. Also in this case, advantages similar to those of the third embodiment can be obtained.

Although the cooling water is used as the cooling medium in each of the above embodiments, a cooling medium other than the cooling water such as oil or alcohol may also be used.

In the second embodiment, the downstream section of the oxidant gas flow passage 30 is partitioned into the first water flow passage 78 between the first separator 22 and the first gas diffusion porous body 70 and the other part by the first gas diffusion porous body 70. The width of the first water flow passage 78 is not limited to the range of 5 μm to 30 μm and may lie in the range of 10 μm to 50 μm. Further, the width of the other part of the oxidant gas flow passage 30 is not limited to the range of 100 μm to 500 μm and may lie in the range of 30 μm to 1000 μm.

In the second embodiment, the downstream section of the fuel gas flow passage 40 is partitioned into the second water flow passage 88 between the second separator 24 and the second gas diffusion porous body 80 and the other part by the second gas diffusion porous body 80. The width of the second water flow passage 88 is not limited to the range of 5 μm to 30 μm and may lie in the range of 10 μm to 50 μm. Further, the width of the other part of the fuel gas flow passage 30 is not limited to the range of 100 μm to 500 μm and may lie in the range of 30 μm to 1000 μm.

The invention claimed is:

1. A fuel battery comprising a plurality of laminated unit cells, wherein
    each unit cell includes a membrane-electrode assembly, in which an electrode is arranged on each of both surfaces of a solid polymer electrolyte membrane, and a first separator and a second separator arranged to sandwich the membrane-electrode assembly therebetween, an oxidant gas flow passage is formed between the first separator and the membrane-electrode assembly of each unit cell, a fuel gas flow passage is formed between the second separator and the membrane-electrode assembly of each unit cell, and a flowing direction of oxidant gas in the oxidant gas flow passage of each unit cell is opposite to that of fuel gas in the fuel gas flow passage of the same unit cell,
    each oxidant gas flow passage includes an upstream section and a downstream section with respect to the flowing direction of the oxidant gas in the oxidant gas flow passage, the upstream section of the oxidant gas flow passage is formed as a plurality of groove flow passages independent of each other by providing a plurality of first grooves on a surface of the first separator that faces the membrane-electrode assembly of each unit cell, and a first gas diffusion porous body is arranged in the downstream section of each oxidant gas flow passage, with no gas diffusion porous body being arranged in the upstream section of each oxidant gas flow passage,
    each fuel gas flow passage includes an upstream section and a downstream section with respect to the flowing direction of the fuel gas in the fuel gas flow passage, the upstream section of the fuel gas flow passage is formed as a plurality of groove flow passages independent of each other by providing a plurality of second grooves on a surface of the second separator that faces the membrane-electrode assembly of each unit cell, and a second gas diffusion porous body is arranged in the downstream section of each fuel gas flow passage, and
    a cooling medium flow passage is formed between the first separator of each unit cell and the second separator of a unit cell adjacent to the same unit cell, a flowing direction of a cooling medium in the cooling medium flow passage between the unit cells adjacent to each other is the same as that of the oxidant gas in the oxidant gas flow passages of these unit cells, each cooling medium flow passage includes an upstream section and a downstream section with respect to the flowing direction of the cooling medium in the cooling medium flow passage, and the upstream section of each cooling medium flow passage is located closer to a surface of the membrane-electrode assembly that faces the oxidant gas flow passage adjacent to the cooling medium flow passage as compared with the downstream section of the cooling medium flow passage.

2. A fuel battery comprising a plurality of laminated unit cells, wherein each unit cell includes a membrane-electrode assembly, in which an electrode is arranged on each of both surfaces of a solid polymer electrolyte membrane, and a first separator and a second separator arranged to sandwich the membrane-electrode assembly therebetween, an oxidant gas flow passage is formed between the first separator and the membrane-electrode assembly of each unit cell, a fuel gas flow passage is formed between the second separator and the membrane-electrode assembly of each unit cell, and a flowing direction of oxidant gas in the oxidant gas flow passage of each unit cell is opposite to that of fuel gas in the fuel gas flow passage of the same unit cell, each oxidant gas flow passage includes an upstream section and a downstream section with respect to the flowing direction of the oxidant gas in the oxidant gas flow passage, the upstream section of the oxidant gas flow passage is formed as a plurality of groove flow passages independent of each other by providing a plurality of first grooves on a surface of the first separator that faces the membrane-electrode assembly of each unit cell, and a first gas diffusion porous body is arranged in the downstream section of each oxidant gas flow passage, with no gas diffusion porous body being arranged in the upstream section of each oxidant gas flow passage, each fuel gas flow passage includes an upstream section and a downstream section with respect to the flowing direction of the fuel gas in the fuel gas flow passage, in the upstream section of the fuel gas flow passage, a plurality of second grooves are provided on a surface of the second separator that faces the membrane-electrode assembly of each unit cell, and a second gas diffusion porous body is arranged in the downstream section and the upstream section of each fuel gas flow passage, and a cooling medium flow passage is formed between the first separator of each unit cell and the second separator of a unit cell adjacent to the same unit cell, a flowing direction of a cooling medium in the cooling medium flow passage between the unit cells adjacent to each other is the same as that of the oxidant gas in the oxidant gas flow passages of these unit cells, each cooling medium flow passage includes an upstream section and a downstream section with respect to the flowing direction of the cooling medium in the cooling medium flow passage, and the upstream section of each cooling medium flow passage is located closer to a surface of the membrane-electrode assembly that faces the oxidant gas flow passage adjacent to the cooling medium flow passage as compared with the downstream section of the cooling medium flow passage.

3. A fuel battery comprising a plurality of laminated unit cells, wherein each unit cell includes a membrane-electrode assembly, in which an electrode is arranged on each of both surfaces of a solid polymer electrolyte membrane, and a first separator and a second separator arranged to sandwich the membrane-electrode assembly therebetween, an oxidant gas flow passage is formed between the first separator and the membrane-electrode assembly of each unit cell, a fuel gas flow passage is formed between the second separator and the membrane-electrode assembly of each unit cell, and a flowing direction of oxidant gas in the oxidant gas flow passage of each unit cell is the same as that of fuel gas in the fuel gas flow passage of the same unit cell, each oxidant gas flow passage includes an upstream section and a downstream section with respect to the flowing direction of the oxidant gas in the oxidant gas flow passage, the upstream section of the oxidant gas flow passage is formed as a plurality of groove flow passages independent of each other by providing a plurality of first grooves on a surface of the first separator that faces the membrane-electrode assembly of each unit cell, and a first gas diffusion porous body is arranged in the downstream section of each oxidant gas flow passage, with no gas diffusion porous body being arranged in the upstream section of each oxidant gas flow passage, each fuel gas flow passage includes an upstream section and a downstream section with respect to the flowing direction of the fuel gas in the fuel gas flow passage, and a second gas diffusion porous body is arranged in the downstream section and the upstream section of each fuel gas flow passage, and a cooling medium flow passage is formed between the first separator of each unit cell and the second separator of a unit cell adjacent to the same unit cell, a flowing direction of a cooling medium in the cooling medium flow passage between the unit cells adjacent to each other is the same as that of the oxidant gas in the oxidant gas flow passages of these unit cells, each cooling medium flow passage includes an upstream section and a downstream section with respect to the flowing direction of the cooling medium in the cooling medium flow passage, and the upstream section of each cooling medium flow passage is located closer to a surface of the membrane-electrode assembly that faces the oxidant gas flow passage adjacent to the cooling medium flow passage as compared with the downstream section of the cooling medium flow passage.

4. The fuel battery according to claim 1, wherein the first separator of each unit cell is held in contact with the membrane-electrode assembly of the same unit cell at a part corresponding to the upstream section of the cooling medium flow passage.

5. The fuel battery according to claim 1, wherein a first water flow passage for discharging water in the oxidant gas flow passage from the oxidant gas flow passage is provided between the first separator and the first gas diffusion porous body of each unit cell, and as the oxidant gas flows in the oxidant gas flow passage, the water in the first water flow passage moves in the same direction as the flowing direction of the oxidant gas and is discharged from the oxidant gas flow passage.

6. The fuel battery according to claim 1, wherein a second water flow passage for discharging water in the fuel gas flow passage from the fuel gas flow passage is provided between the second separator and the second gas diffusion porous body of each unit cell, and as the fuel gas flows in the fuel gas flow passage, the water in the second water flow passage moves in the same direction as the flowing direction of the fuel gas and is discharged from the fuel gas flow passage.

7. The fuel battery according to claim 2, wherein the first separator of each unit cell is held in contact with the membrane-electrode assembly of the same unit cell at a part corresponding to the upstream section of the cooling medium flow passage.

8. The fuel battery according to claim 2, wherein
a first water flow passage for discharging water in the oxidant gas flow passage from the oxidant gas flow passage is provided between the first separator and the first gas diffusion porous body of each unit cell, and
as the oxidant gas flows in the oxidant gas flow passage, the water in the first water flow passage moves in the same direction as the flowing direction of the oxidant gas and is discharged from the oxidant gas flow passage.

9. The fuel battery according to claim 2, wherein
a second water flow passage for discharging water in the fuel gas flow passage from the fuel gas flow passage is provided between the second separator and the second gas diffusion porous body of each unit cell, and
as the fuel gas flows in the fuel gas flow passage, the water in the second water flow passage moves in the same direction as the flowing direction of the fuel gas and is discharged from the fuel gas flow passage.

10. The fuel battery according to claim 3, wherein the first separator of each unit cell is held in contact with the membrane-electrode assembly of the same unit cell at a part corresponding to the upstream section of the cooling medium flow passage.

11. The fuel battery according to claim 3, wherein
a first water flow passage for discharging water in the oxidant gas flow passage from the oxidant gas flow passage is provided between the first separator and the first gas diffusion porous body of each unit cell, and
as the oxidant gas flows in the oxidant gas flow passage, the water in the first water flow passage moves in the same direction as the flowing direction of the oxidant gas and is discharged from the oxidant gas flow passage.

12. The fuel battery according to claim 3, wherein
a second water flow passage for discharging water in the fuel gas flow passage from the fuel gas flow passage is provided between the second separator and the second gas diffusion porous body of each unit cell, and
as the fuel gas flows in the fuel gas flow passage, the water in the second water flow passage moves in the same direction as the flowing direction of the fuel gas and is discharged from the fuel gas flow passage.

* * * * *